United States Patent [19]
Bykhovsky et al.

[11] 4,055,741
[45] Oct. 25, 1977

[54] PLASMA ARC TORCH

[76] Inventors: David Grigorievich Bykhovsky, Konjushenny pereulok, 1/16, kv. 18; Alexandr Yakovlevich Medvedev, ulitsa Kalyaeva, 3, kv. 17; Jury Alexandrovich Bogorodsky, prospekt Mechnikova, 14, kv. 163; Vladimir Nikolaevich Firsov, ulitsa Gribaleva, 12, kv. 50; Yakov Vulfovich Rossomakho, Bolshoi prospekt, 27/1, kv. 40, all of Leningrad, U.S.S.R.

[21] Appl. No.: 638,941
[22] Filed: Dec. 8, 1975
[51] Int. Cl.² .............................................. B23K 9/00
[52] U.S. Cl. .................................................. 219/121 P
[58] Field of Search .............. 219/121 P, 74, 75, 145; 313/231.3

[56] References Cited

U.S. PATENT DOCUMENTS

| | | | |
|---|---|---|---|
| 3,242,305 | 3/1966 | Kane et al. | 219/121 P X |
| 3,375,392 | 3/1968 | Brzozowski et al. | 219/121 P X |
| 3,571,556 | 3/1971 | Wustner | 219/121 P |
| 3,612,807 | 10/1971 | Liefkens et al. | 219/121 P |
| 3,811,029 | 5/1974 | Averyanov et al. | 219/75 X |
| 3,838,242 | 9/1974 | Goucher | 219/121 P |
| 3,930,139 | 12/1975 | Bykhovsky | 219/145 |

*Primary Examiner*—Elliot A. Goldberg
*Assistant Examiner*—Fred E. Bell
*Attorney, Agent, or Firm*—Lackenbach, Lilling & Siegel

[57] ABSTRACT

A plasma arc torch is of a two-part design and comprises two detachable and tightly joined parts mating with each other of which one part contains an electrode holder with an electrode, a nozzle disposed coaxially of said electrode and having means for supplying an electric current thereto. An insulator is located between said electrode holder and said nozzle, wherein there are also provided passages for the supply of plasma-generating gas and coolant, these being brought out onto the mating surface of the first part. The second part of the torch accommodates means for supplying an electric current to the electrode holder and means for supplying coolant and plasma-generating gas through passages brought out onto the mating surface of the second part so that they match with the corresponding passages of the first part on the surface of the joint thereof.

7 Claims, 8 Drawing Figures

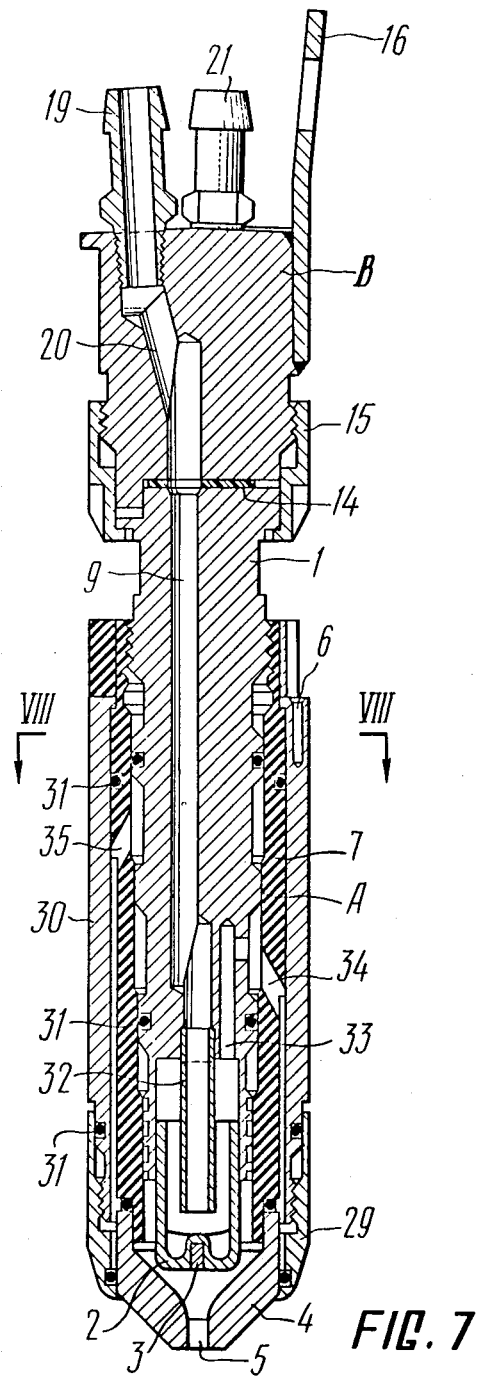
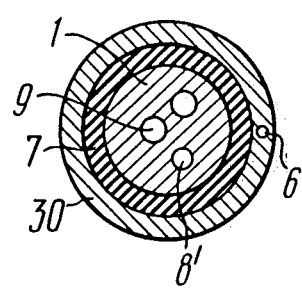
FIG. 7
FIG. 8

PLASMA ARC TORCH

The present invention relates to plasma arc torches for plasma treatment of electrically conductive materials.

It is most preferable to use a plasma arc torch for plasma treatment of metals utilizing as a plasma-generating medium chemically active gases selected from the group including compressed air, oxygen, carbon dioxide gas, nitrogen, natural gas, etc. Moreover, the use of the proposed plasma arc torch gives good results when gases selected from the group. including argon helium, hydrogen or mixtures thereof, are used as a plasma-generating medium.

The main field of application for the proposed plasma arc torch is plasma cutting of metals in the medium of oxygen-containing plasma-generating gases, such as compressed air or oxygen. The most preferable field of application for the proposed plasma arc torch is mechanized plasma cutting of metals under production line conditions when the cutting process schedule is wholly determined by the working conditions and the rhythm of a line producing cut products as, for instance, in continuous casting of metals, in the manufacture of electric-welded spiral pipe and tube, in the manufacture of ships, etc.

Furthermore, the proposed plasma arc torch can be implemented for plasma welding of ferrous and non-ferrous metals at a direct current of straight or reverse polarity utilizing $CO_2$ or argon as the plasma-generating gas.

The modern or known technique for plasma cutting of metals is characterized by the development of plasma arc torches capable of operating in the medium of compressed air or oxygen at 500A currents and cutting plates up to 100 mm thick at a speed of 0.5 cm/sec.

High productivity and the possibility of use of available and cheap energy carriers, compressed air and an electric current, enable plasma arc torches to be employed at a production line turning out articles subject to subsequent cutting.

For example, when continuously casting a 100 × 100 mm ingot the time of producing a 3000-mm long strand amounts to approximately 81 sec, according to the data of the British company "BTSA". Cutting of this cast strand will take approximately 35 sec and thereby the rest of the time, i.e., 46 sec. can be utilized for preliminary operations.

When casting continuously a 75 × 75 mm ingot, the time of producing a 3000-mm long strand (according to the data of Boichenko et al. "Continuous Steel Casting," the USSR Academy of Sciences, 1956) is approximately 60 sec. To cut the above strand to length will require 13 sec., thus the 47 sec left can be used for preliminary procedures.

At present, in the USSR, mills have been developed for in-line production of electric-welded thin wall spiral tubing. The production conditions require that tubing should be cut to length at a speed of 33 cm/sec. with a cutting time not more than 5 sec. In this case, the time for preliminary procedures does not exceed 55 sec.

Presently, plasma arc torches are widely known in the art for cutting in chemically active gases (U.S. Pat. Nos. 3,597,649; 3,646,422; 3,366,722; 2,806,124; and 3,141,953) and also electrodes (U.S. Pat. Nos. 3,758,746 and 3,198,932). However, when working under heavy-rate conditions required for the production line operation, the prior art torches rapidly fail since the main replacement parts thereof, the electrode and the nozzle, possess a short service life. In connection with the above, under production line conditions and with the modern or known state of art in the plasma arc cutting technique only a few cuts can be made without changing the electrode and the nozzle.

The well known plasma arc torches do not provide for changing of rapidly wearing parts during the time required to accomplish a full working cycle under the production line conditions.

This drawback of the well known plasma arc torches results from the fact that changes of rapidly wearing parts therein must be done separately.

Another shortcoming of these plasma arc torches lies in that said torches do not possess optimum working geometry ensuring maximum speed under heavy-rate operating conditions. It should be understood that "working geometry" embraces the shape of the nozzle inner surface, the shape of the electrode outer and inner surfaces and mutual arrangement thereof.

It should also be understood that "heavy-rate" operating conditions mean operation at high current densities in the plasma arc torch nozzle passage and also high consumption rates of plasma-generating gas.

The principal object of the present invention is to provide a plasma arc torch for metal cutting in active gases under production line conditions wherein all rapidly wearing parts, i.e. the electrode and the nozzle, can be changed simultaneously in a minimum time interval.

Another object of the present invention is to provide a plasma arc torch for metal cutting in active gases under production line conditions wherein all rapidly wearing parts can be changed simultaneously and all pipelines for coolant intended to cool the rapidly wearing electrode and nozzle as well as lines for plasma-generating gas can also be simultaneously connected to or disconnected from respective supply sources of the coolant and plasma generating gas.

Still another object of the present invention is to provide a plasma arc torch for metal cutting in active gases under production line conditions wherein the working geometry of the electrode and the nozzle ensures maximum cutting speeds under heavy-rate operating conditions.

These objects of the invention are attained by providing a plasma arc torch comprising an electrode mounted in an electrode holder, a nozzle with a cylindrical passage disposed co-axially of the electrode, an electrical insulator located between the electrode holder and the nozzle, means for supplying coolant through passages to the electrode holder and the nozzle, means for supplying plasma-generating gas through passages and also means for supplying an electric current to said electrode and said nozzle. According to the invention, said torch is a two-part design and consists of two detachable and tightly joined parts mating with each other, in the first part of which are contained the electrode with the electrode holder, the insulator and the nozzle with the means for supplying an electric current thereto, with passages for plasma-generating gas and coolant being brought out to the mating surface of said first part. The second part thereof accommodates means for supplying an electric current to the electrode holder, means for supplying coolant and plasma-generating gas, the passages thereof being also brought out onto the mating surface of the second part in such a manner that they match with the corresponding passages in the first part on the surface of the joint thereof.

It is preferable that all said passages in the plasma arc torch for the coolant and the plasma-generating gas in the first part of the torch containing the electrode with the electrode holder, the insulator and the nozzle with the means for supplying an electric current thereto be brought out onto the electrode holder surface mating with the second part of said torch accommodating the means for supplying an electric current to the electrode holder and the means for supplying through the passages of the coolant and the plasma-generating gas.

Furthermore, it is preferable that in the first part of the plasma torch, the inner surface of said nozzle, beginning from the bottom cut face thereof, be made in the form a cylindrical passage mating with a cone along a curved convex surface and the electrode outer surface protruding from the electrode holder be made in the form of a cylinder mating with the end face of said electrode by a curved convex surface. It is also preferable that said electrode and said nozzle be separated by a passageway for passing of the plasma-generating gas and the geometrical dimensions of said nozzle and said electrode be related to each other using the following relationships selected within the limits given below:

$H_{NP} = (1.5 \text{ to } 2.0)D_N$
$R_N = (0.9 \text{ to } 2.2)D_N$
$D_e = (4 \text{ to } 5)D_N$
$H_e = (3 \text{ to } 4)D_N$
$R_e = (0.9 \text{ to } 1.2)D_N$
$H_{Ne} = (3.5 \text{ to } 4.5)D_N$
$\Delta Ne = (0.2 \text{ to } 0.4)D_N$
$D_N = 3 \text{ to } 4 \text{ mm}$ where $H_{NP}$ is the height of the nozzle cylindrical passage,
$R_N$ is the radius of said convex surface of the nozzle,
$D_e$ is the diameter of the electrode cylindrical portion,
$H_e$ is the height of the electrode cylindrical portion protruding from the electrode holder,
$R_e$ is the radius of said convex surface of the electrode,
$H_{Ne}$ is a distance from the bottom cut face of the nozzle to the electrode end face,
$\Delta Ne$ is a passageway between the nozzle and the electrode,
$D_N$ is the diameter of the nozzle cylindrical passage.

It is also preferable that in the first part of the plasma arc torch said electrode should be made in the form of a copper cylindrical sleeve preferably having in the center of the inner bottom cavity thereof a pin-shaped projection with an active insert of zirconium, hafnium, tungsten or alloys on the basis thereof, said insert preferably being fitted flush with the outer surface of said sleeve so that the whole of the remaining portion of the active insert be located within the body of the pin-shaped projection, the outer generating surface of the pin-shaped projection and the inner surface of said sleeve being preferably connected therebetween by means of fins, more than two in number.

Solutions suggested by the present invention make it possible to provide a plasma arc torch for plasma arc cutting of metals under production line conditions at working currents of up to 600A utilizing compressed air or oxygen as the plasma-generating gas.

The proposed plasma arc torch promotes a simultaneous change of rapidly wearing parts, the electrode and the nozzle, during a time interval not exceeding 30 sec. which permits successful employment of the proposed torch on a production line, e.g., for cutting ingots in continuous metal casting plants, severing tubing on electric-weld spiral tube mills as well as for in-line contour-cutting of parts on program-controlled machines and other similar production processes.

The proposed plasma arc torch, when utilizing compressed air or oxygen as the plasma-generating gas, enables maximum cutting speeds to be used for steel; these speeds are represented in Table 1.

Table 1

| Plate thickness, cm current, A | Maximum cutting speed for steel plate, cm/sec | | | | | |
|---|---|---|---|---|---|---|
| | 0.5 | 1.0 | 2.0 | 6.0 | 10.0 | 14.0 |
| 300 | 19.2 | 9.9 | 3.9 | 0.55 | — | — |
| 400 | 24.0 | 13.2 | 6.8 | 0.94 | 0.18 | 0.084 |
| 500 | 24.0 | 13.2 | 7.7 | 1.2 | 0.24 | 0.102 |
| 600 | — | — | 7.8 | 1.4 | 0.30 | 0.156 |

The proposed plasma arc torch permits full utilization of the operational life of the electrode at currents of 500A for not less than 3 hours of continuous operation or switching-on not less than 10–15 times for 5 min and not less than 40–50 times for 0.5 min in intermittent operation.

The invention will be hereinafter described taking by way of example an embodiment thereof and with reference to the accompanying drawings in which:

FIGS. 6, 7 show the plasma arc torch design in accordance with the invention;

FIG. 8 is a sectional view taken along the line VIII—VIII of FIG. 7.

Figure 1:
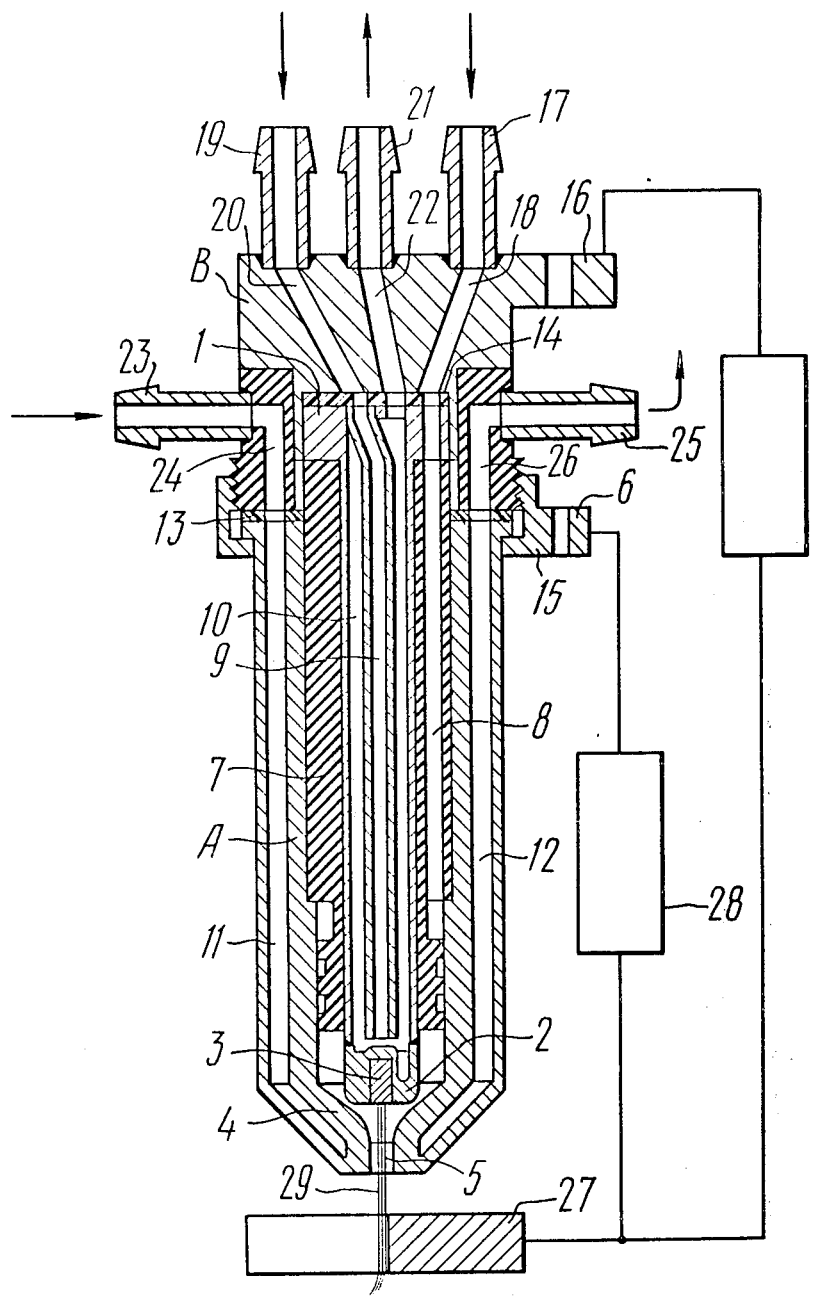
FIG. 1 is a schematic sectional view of a plasma arc torch.

The plasma arc torch (FIG. 1) according to the invention is a two-part design and comprises two detachable and tightly joined parts A and B mating with each other. The first part A of the plasma arc torch (FIGS. 1 and 2) houses an electrode holder 1 wherein is mounted an electrode 2 with an active insert 3. Coaxially of the electrode 2 is installed a nozzle 4 with a cylindrical passage 5. The nozzle 4 is connected through means 6 for supplying of an auxiliary arc (terminal) electric current to a power source. Between the electrode holder 1 and the nozzle 4 there is located an electrical insulator 7 wherein a passage 8 for plasma-generating gas is formed. In addition, in the first part A of the torch there are arranged a passage 9 to supply a coolant to the electrode 2 provided in the electrode holder 1, a passage 10 to discharge the coolant from the electric holder 1, a passage 11 to supply a coolant to the nozzle 4 and a passage 12 for the coolant discharge from the nozzle 4. It is preferable to use water as the coolant.

Figure 2:
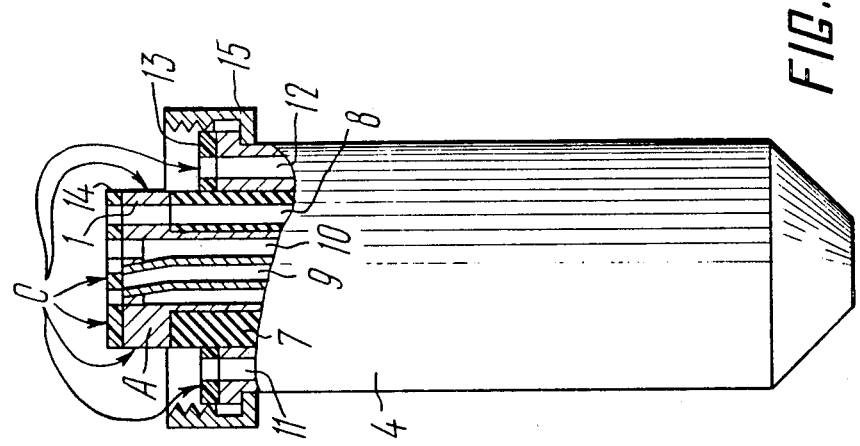
FIG. 2 shows a part of the torch containing an electrode and a nozzle.

All the passages 8, 9, 10, 11 and 12 in said first part (FIG. 2) of the plasma arc torch are brought out onto a surface C mating with surface D (FIG. 3) of said second part B and tightly joined therewith. The tightness of this joint is achieved by means of seals 13 and 14 attached to the mating surface C (FIG. 2). Fastening of the first part A of the torch (FIG. 2) to the second part B thereof (FIG. 3) is obtained by means of a nut 15. Other fastening means, however may also be used, provided they ensure fast and tight joining of the parts being fastened.

Said second part B (FIG. 3) accommodates means 16 (terminals) for supplying an electric current from the power source to the electrode holder 1; means 17 for supplying through a passage 18, a plasma-generating gas; means 19 for supplying a coolant through a passage 20 to the electrode holder 1; means 21 for discharging the coolant through a passage 22 from the electrode holder 1; means 23 for supplying a coolant through a passage 24 to the nozzle 4; means 25 for discharging the coolant through a passage 26 to the nozzle 4 pipe connections are used as the means 17, 19, 21, 23, 25.

The aforementioned passages 18, 20, 22, 24 and 26 are brought out onto the mating surface D so that upon joining of the first part A (FIG. 2) with the second part B (FIG. 3), said passages match with the corresponding passages 8, 9, 10, 11 and 12, on the mating surfaces of the joint thereof.

Figure 3:
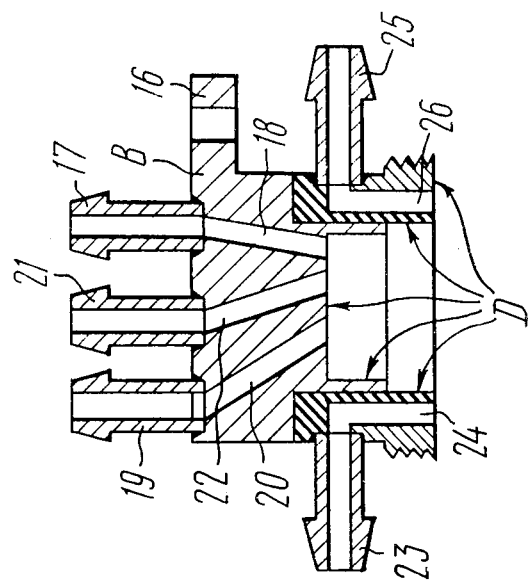
FIG. 3 shows a part of the torch accommodating means for supplying coolant, plasma-generating gas and an electric current.

The part B of the plasma arc torch shown in FIG. 3 is secured to a displacement mechanism of said torch. Such design permits changing rapidly wearing parts simultaneously, i.e., the electrode 2 and the nozzle 4, sparing one the trouble of handling the means for supplying an electric current, the coolant and the plasma-generating gas. The nozzle 4 of the plasma arc torch is made of copper. The electrode 2 is also made of copper whereas the active insert can be made from zirconium, hafnium or alloys on the basis thereof.

Compressed air, oxygen or carbon dioxide gas should be used herein as the plasma-generating gas. The electrode 2, in this case, is connected to the negative pole of the power source.

If the active insert 3 is made of tungsten or alloys on the basis thereof, argon, nitrogen, hydrogen, helium or mixtures thereof should be utilized as the plasma-generating gas. In this case, the electrode 2 may be connected both to the negative or to the positive pole of the power source.

The plasma arc torch described, when used for plasma arc cutting of metals, operates as follows. The plasma arc torch is attached to the torch displacement mechanism (not shown in FIG. 1) by means of the part B represented in FIG. 3. Direct current from the negative pole of the power source is fed to the means 16 for the electric current supply. The plasma-generating gas (compressed air or oxygen) and coolant are fed to the corresponding means 17, 19, 23, 21 and 25. The positive pole of the power source is connected to a workpiece 27. The nozzle 4, via the means 6 for the electric current supply, is connected to means 28, e.g., an oscillator for striking an auxiliary arc between the electrode 2 and the nozzle 4.

Upon the auxiliary arc between the electrode 2 and the nozzle has been struck, the ionized plasma-generating gas is blown out of the passage 5 of the nozzle 4 and closes the circuit of the power source current formed between the active insert 3 of the electrode 2 and the workpiece 27 being processed generating a plasma cutting arc 29.

The proposed plasma arc torch operates most efficiently when employed under high-power conditions characterized by average current densities in the passage 5 of the nozzle 4 amounting to 40-50 A/mm$^2$ and the plasma-generating gas flow rate of 6-10 m$^3$/hr (the flow rate of the plasma generating gas is taken for $T = 20°$ C and $P = 760$ mm m.c.).

We have found that the maximum cutting speed, when using compressed air or oxygen, ensuring appropriate rythm of the production line is attained with the proposed plasma arc torch having the nozzle 4 and the electrode 2 of certain configurations.

Figures 4, 5:
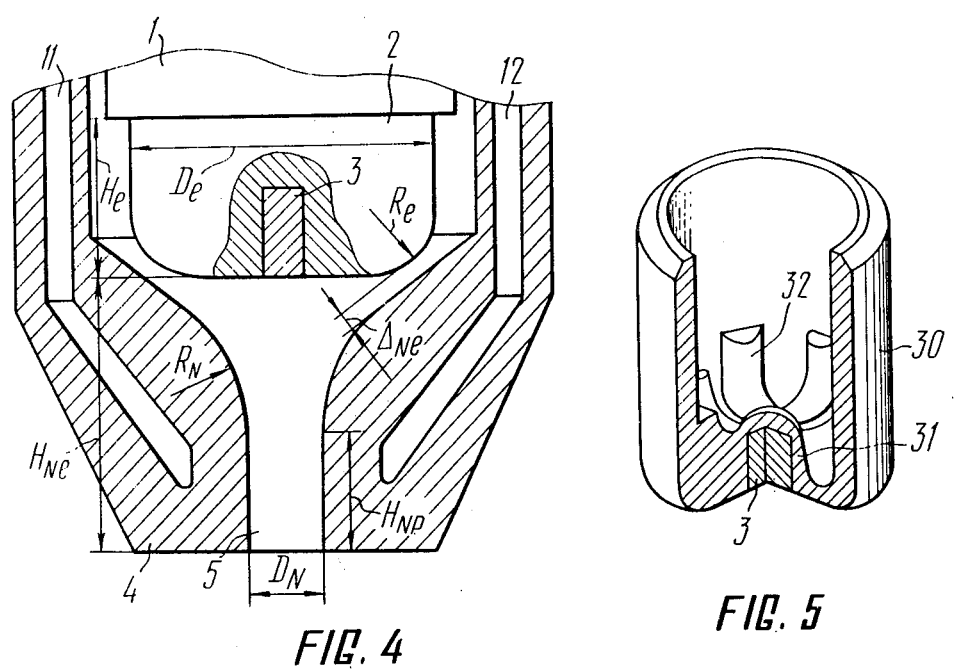
FIG. 4 is a schematic sectional view of the torch part containing an electrode and a nozzle showing the optimum configurations thereof.
FIG. 5 is an axonometric view of the electrode of said torch.

FIG. 4 shows schematically the part of the plasma arc torch comprising the electrode 2 with the active insert 3 and the nozzle 4 with the cylindrical passage 5 disposed coaxially of the electrode 2. The nozzle 4 is provided with passages 11 and 12 for the coolant, water being used as such.

In this case, the maximum cutting speed with high reliability provided is attained due to the following configuration and mutual arrangement of the nozzle 4 and the electrode 2. The inner surface of the nozzle 4, beginning from the bottom cut face thereof, has the form of the cylindrical passage 5 mating with a cone along a curved surface. The outer-surface of the electrode 2 protruding from the electrode holder 1 has the form of a cylinder mating by its curved surface with the end face of the electrode 2. Between the electrode 2 and the nozzle 4 is provided a passageway designated as $\Delta Ne$.

The results of such investigations have indicated that in order to fully realize current densities within a range of 40-50 A/mm$^2$ in the passage 5 of the nozzle 4, the diameter of the passage 5 of the nozzle 4 should be chosen within the limits of $D_N = 3$ to 4 mm.

The height ($H_{NP}$) of the cylindrical passage 5 of the nozzle 4 is one of the most important parameters determining the maximum cutting speed. We have found that the above height should equal $H_{NP} = (1.5$ to $2.0)D_N$, the most preferable value being $H_{NP} = 6$ mm. The diameter of the cylindrical partion $D_e$ of the electrode 2 should be selected within $D_e = (4$ to $5)D_N$, the most preferable value being $D_e = 16$ mm. The height $H_e$ of the electrode 2 should be chosen within $H_e = (3$ to $4)D_N$, the most preferable value being $H_e = 12$ mm.

To form an optimum flow of the plasma-generating gas and achieve the maximum enthalpy of the plasma jet, it is important to provide adequate rationships between the height $H_{Ne}$, the convex surface radius $R_N$, the convex surface radius $Re$ and the passageway $\Delta Ne$.

We have also found that the foregoing parameters should satisfy the following requirements: $H_{Ne} = (3.5$ to $4.5)D_N$, the most preferable value being $H_{Ne} = 12$ to $14$ mm; $R_N = = (0.9$ to $2.2)D_N$, the most preferable value being $R_N = 4$ to 8 mm; $R_e = (0.9$ to $1.2)D_N$, the most preferable value being $R_e = 3.5$ mm; $\Delta NE = (0.2$ to $0.4)D$, the most preferable value being $\Delta Ne = 1.0$ mm.

We have found that the best effect is obtained if the plasma-generating gas enters the passageway $\Delta Ne$ in the form of a vortex flow. In this case, it is preferable that the plasma-generating gas be entered into the nozzle 4 at a distance of $H_e$ from the end of the electrode 2. It is also preferable to direct the gas at an angle to the generatrix of the cylindrical portion of the electrode 2, the angle being from 0° to 45°. The plasma-generating gas flow rate should preferably be maintained at 8 m$^3$/hr.

According to the invention, to provide maximum cutting current (up to 600A), the electrode 2 making an integral part of the plasma arc torch should be of the design illustrated in FIG. 5.

The electrode 2 is made in the form of a copper cylindrical sleeve 30. In the center of the bottom of the inner cavity of the cylindrical sleeve 30 there is formed a pin-shaped projection 31 with an active insert 3 made of zirconium, hafnium, tungsten or alloys thereof. The insert 3 is fitted flush with the flat outer surface of the sleeve 30 so that the whole of the remaining portion of the insert 3 is incorporated within the body of the pin-shaped projection 31. The outer generating surface of the pin-shaped projection 31 and the inner surface of the sleeve 30 are connected therebetween by fins 32, more than two in number. It is preferable to have six fins 32.

The results of our studies have shown that with an optimum outer surface configuration of the electrode 2 it is necessary to create prerequisites providing optimum temperature conditions for the active insert 3. The best effect is obtained by intense and uniform cooling of the insert 3 along the entire length thereof. At the same time, it is necessary to maintain over a heat-dissipating area a temperature lower than a critical one at which film boiling occurs.

Uniform cooling of the insert 3 is obtained by virtue of provision of the cooling water flowing over a considerable portion of the surface of the pin-shaped projection 31. The fins 32 enable the heat-dissipating area to be increased to an amount excluding any risk the film boiling occurance. Moreover, the proposed design provides that the electrode 2 should be made by cold forming of a cylindrical copper blank with the active insert 3 preliminary fitter thereinto. In this way, due to the proposed design of the electrode 2 proper heat contact is attained between the insert 3 and the copper sleeve 30.

Figure 6:
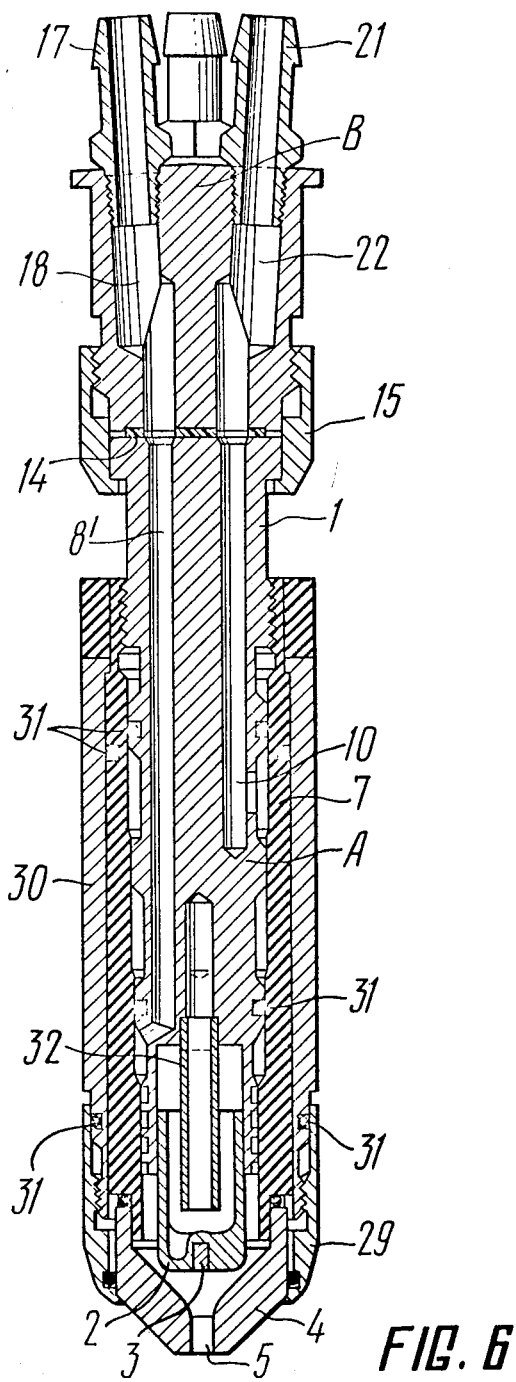

Given below is a specific embodiment of the plasma arc torch in accordance with the present invention (FIGS. 6, 7, 8).

A part of said torch secured to the torch displacement mechanism contains means 17 for supplying plasma-generating gas through the passage 18, means 19 for supplying cooling water through the passage 20 and means 21 for discharging cooling water via the passage 22 as well as the means 16 for supplying an electric current to the electrode holder. Tightly joined to said part by means of the nut 15 is the replacement part of the plasma arc torch. Said replacement part accommodates the electrode holder 1. Within the electrode holder 1 is taper fitted the electrode 2 with the active insert 3. Attached to the electrode holder 1 is the insulator 7. The insulator 7 mounts the copper nozzle 4 with the central cylindrical passage 5. The passage 5 is disposed coaxially of the insert 3 of the electrode 2. The nozzle 4 is secured by means of the nut 29 screwed upon an enclosure 30. The enclosure 30 is provided with means 6 for the supply of an electric current to the nozzle 4. Said part of the torch is fitted with O-ring rubber seals 31 and a seal 14. The electrode holder is provided with a passage 8 for the supply of plasma-generating gas. For the cooling water supply to the electrode 2, in the electrode holder there is provided a passage 9 terminating with a tube 32. A passage 33 provided in the electrode holder 1 serves for the supply of the cooling water to the nozzle 4.

The passage 33, via a passage 34 made in the insulator 7, communicates with the nozzle 4. To discharge the cooling water from the nozzle 4, there is a passage 35 provided in the insulator 7 which communicates with the passage 10 provided in the electrode holder 1. A characteristic feature of said torch consists in that all the passages 8, 9 and 10 are brought out onto the surface of the electrode holder 1 mating with the second part of said torch comprising the means 17, 19 and 21 for supplying the coolant and the plasma-generating air as well as the means 16 for supplying an electric current to the electrode holder. Such design wherein all lines for the coolant and the plasma-generating gas are under the same potential makes it possible to obtain the maximum dependability of the plasma arc torch and provide the most rapid change of the cutting part thereof.

The electrode 2 and the nozzle 4 of said torch are embodied as shown in FIGS. 4 and 5.

What is claimed is:

1. A plasma arc torch of a two-part design and comprising two detachable and tightly joined first and second parts mating with each other; the first part containing and rigidly interconnecting: an electrode holder, an electrode mounted in said electrode holder, a nozzle with a cylindrical passage disposed coaxially of said electrode; means for supplying an electric current to said nozzle; an electrical insulator located between said electrode holder and said nozzle; passages for a plasma-generating gas and coolant being brought out into the surface mating with said second part; said second part accommodating: means for supplying an electric current to said electrode holder; means for supplying the coolant through passages to said electrode holder and said nozzle; means for supplying the plasma-generating gas through said passages; said passages of said second part being brought out into the mating surface in such a manner that they match with corresponding passages of said first part on the surface of the joint thereof, whereby said first part may be disconnected from said second part thereby simultaneously removing said electrode and said nozzle.

2. A plasma arc torch as defined in claim 1, wherein all said passages for the coolant and plasma-generating gas in said first part are brought out onto the electrode holder surface mating with said second part of said torch.

3. A plasma arc torch as defined in claim 1, wherein said nozzle has an inner surface beginning from the bottom cut face thereof and has the form of a cylindrical passage mating with a cone over a curved convex surface, and wherein said electrode has an outer surface protruding from the electrode holder and has the form of a cylinder mating with the end face of said electrode by a curved convex surface, said electrode and said nozzle being separated by a passageway for passing plasma-generating gas therethrough and the geometrical dimensions of said nozzle and said electrode being interrelated by the following relationships selected within the limits given below:

$H_{Np} = (1.5$ to $2.0)$ $D_N$
$R_N = (0.9$ to $2.2)$ $D_N$
$D_e = (4$ to $5)$ $D_N$
$H_e = (3$ to $4)$ $D_N$
$R_e = (0.9$ to $1.2)$ $D_N$
$H_{Ne} = (3.5$ to $4.5)$ $D_N$
$Ne = (0.2$ to $0.4)$ $D$
$D_N = 3$ to $4$ mm where $H_{Np}$ is the height of the nozzle cylindrical passage;
$R_N$ is the radius of said convex surface of the nozzle;
$D_e$ is the diameter of the electrode cylindrical portion;
$H_e$ is the height of the electrode cylindrical portion protruding from the electrode holder;
$R_e$ is the radius of said convex surface of the electrode;
$H_{Ne}$ is a distance from the bottom cut end of the nozzle to the electrode end face;
$N_e$ is a passageway between the nozzle and the electrode;
$D_N$ is the diameter of the nozzle cylindrical passage.

4. A plasma arc torch as defined in claim 2, wherein said nozzle has an inner surface, beginning from the bottom cut face thereof and has the form of the cylindrical passage mating with a cone over a curved convex surface, and wherein said electrode has the outer surface protruding from the electrode holder and has the form of a cylinder mating with the end face of said electrode by a curved convex surface, said electrode and said nozzle being separated by a passageway for passing plasma-generating gas therethrough and the geometrical dimensions of said nozzle and said electrode being interrelated by the following relationships selected within the limits given below:

$H_{Np} = (1.5 \text{ to } 2.0)D_N$
$R_N = (0.9 \text{ to } 2.2)D_N$
$D_e = (4 \text{ to } 5)D_N$
$H_e = (3 \text{ to } 4)D_N$
$R_e = (0.9 \text{ to } 1.2)D_N$
$H_{Ne} = (3.5 \text{ to } 4.5)D_N$
$Ne = (0.2 \text{ to } 0.4)D_N$
$D_N = (3 \text{ to } 4 \text{ mm}$ where
$H_{Np}$ is the height of the nozzle cylindrical passage;
$R_N$ is the radius of said convex surface of the nozzle;
$D_e$ is the diameter of the electrode cylindrical portion;
$H_e$ is the height of the electrode cylindrical portion protruding from the electrode holder;
$R_e$ is the radius of said convex surface of the electrode;
$H_{Ne}$ is a distance from the bottom cut end of the nozzle of the electrode end face;
$N_e$ is the passageway between the nozzle and the electrode;
$D_N$ is the diameter of the nozzle cylindrical passage.

5. A plasma-arc torch is defined in claim 1, wherein said electrode is made in the form of a cylindrical copper sleeve in the center of the bottom of the inner cavity of which a pin-shaped projection is provided with an active insert of zirconium, hafnium, tungsten or alloys on the basis thereof, said insert being fitted flush with the outer surface of said sleeve so that the whole of the remaining portion of the active insert is housed within the body of the pin-shaped projection, the outer generating surface of the pin-shaped projection and the inner surface of said sleeve being connected therebetween by at least two fins.

6. A plasma arc torch as defined in claim 2, wherein the electrode is made in the form of the cylindrical copper sleeve in the center of the bottom of the inner cavity of which a pin-shaped projection is provided with an active insert of zirconium, hafnium, tungsten or alloys on the basis thereof, said insert being fitted flush with the outer surface of said sleeve so that the whole of the remaining portion of the active insert is housed within the body of the pin-shaped projection, the outer generating surface of the pin-shaped projection and the inner surface of said sleeve being connected therebetween by at least two fins.

7. A plasma arc torch as defined in claim 3, wherein said electrode is made in the form of a cylindrical copper sleeve in the center of the bottom of the inner cavity of which a pin-shaped projection is provided with an active insert of zirconium, hafnium, tungsten or alloys on the basis thereof, which is fitted flush with the outer surface of said sleeve so that the whole of the remaining portion of the active insert is housed within the body of the pin-shaped projection, the outer generating surface of the pin-shaped projection and the inner surface of said sleeve being connected therebetween by at least two fins.

* * * * *